Dec. 8, 1964  B. T. R. REYMES-COLE  3,159,988
HOSIERY FOOTWEAR AND METHOD OF MAKING
Filed April 24, 1962  6 Sheets-Sheet 1
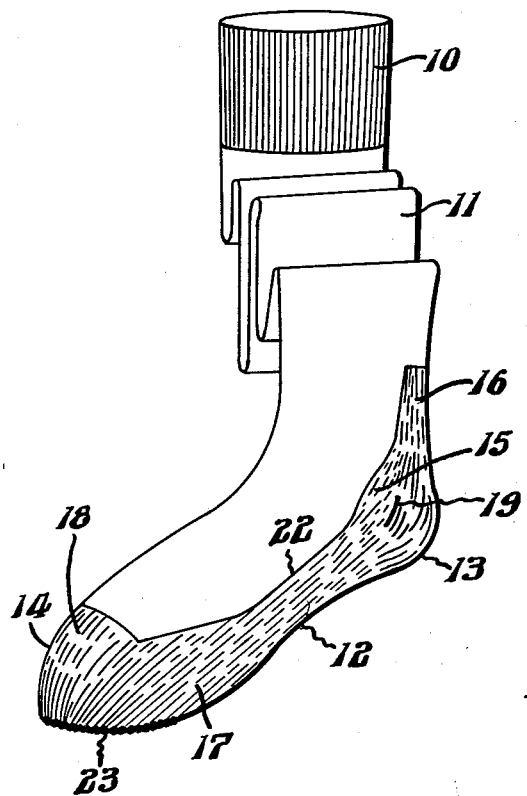
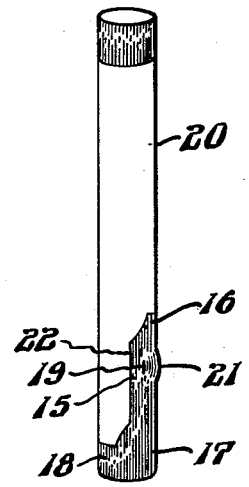
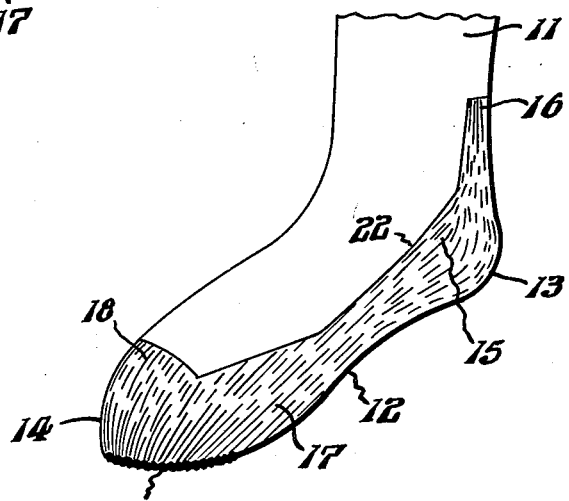
INVENTOR.
Bernard Thornton Reymes Reymes-Cole,
BY
Paul & Paul
ATTORNEYS.

Dec. 8, 1964  B. T. R. REYMES-COLE  3,159,988
HOSIERY FOOTWEAR AND METHOD OF MAKING
Filed April 24, 1962  6 Sheets-Sheet 2
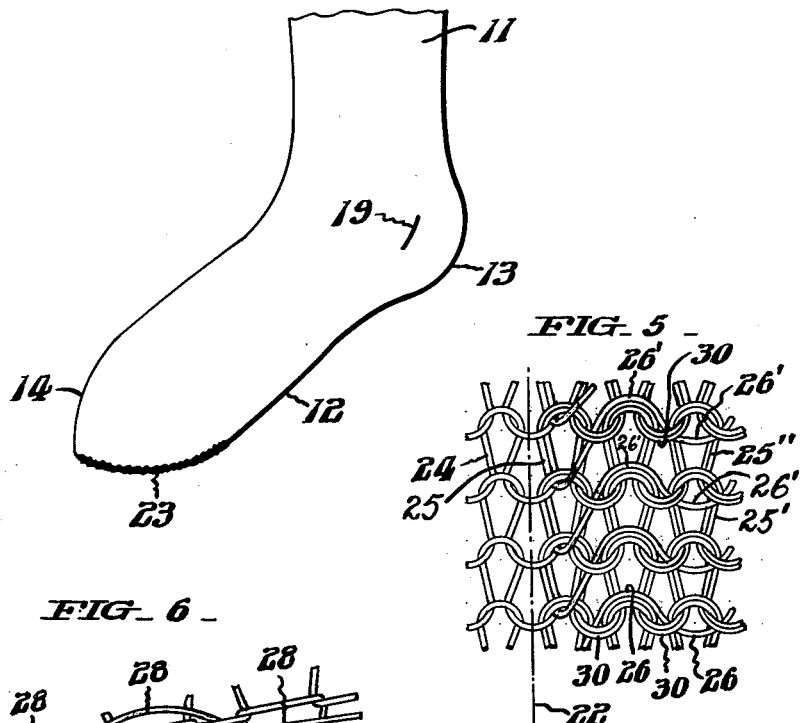
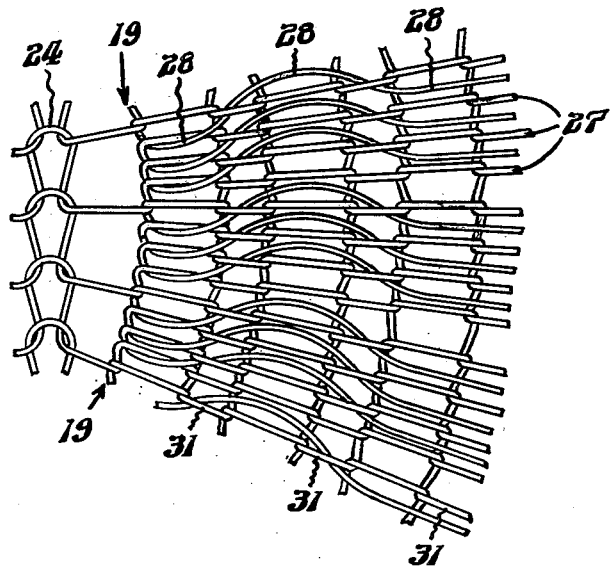
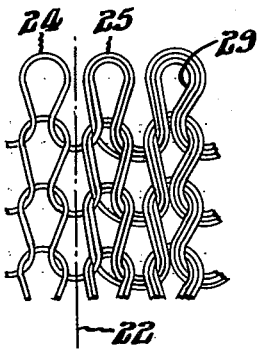
INVENTOR.
Bernard Thornton Reymes Reymes-Cole,
BY
Paul & Paul
ATTORNEYS.

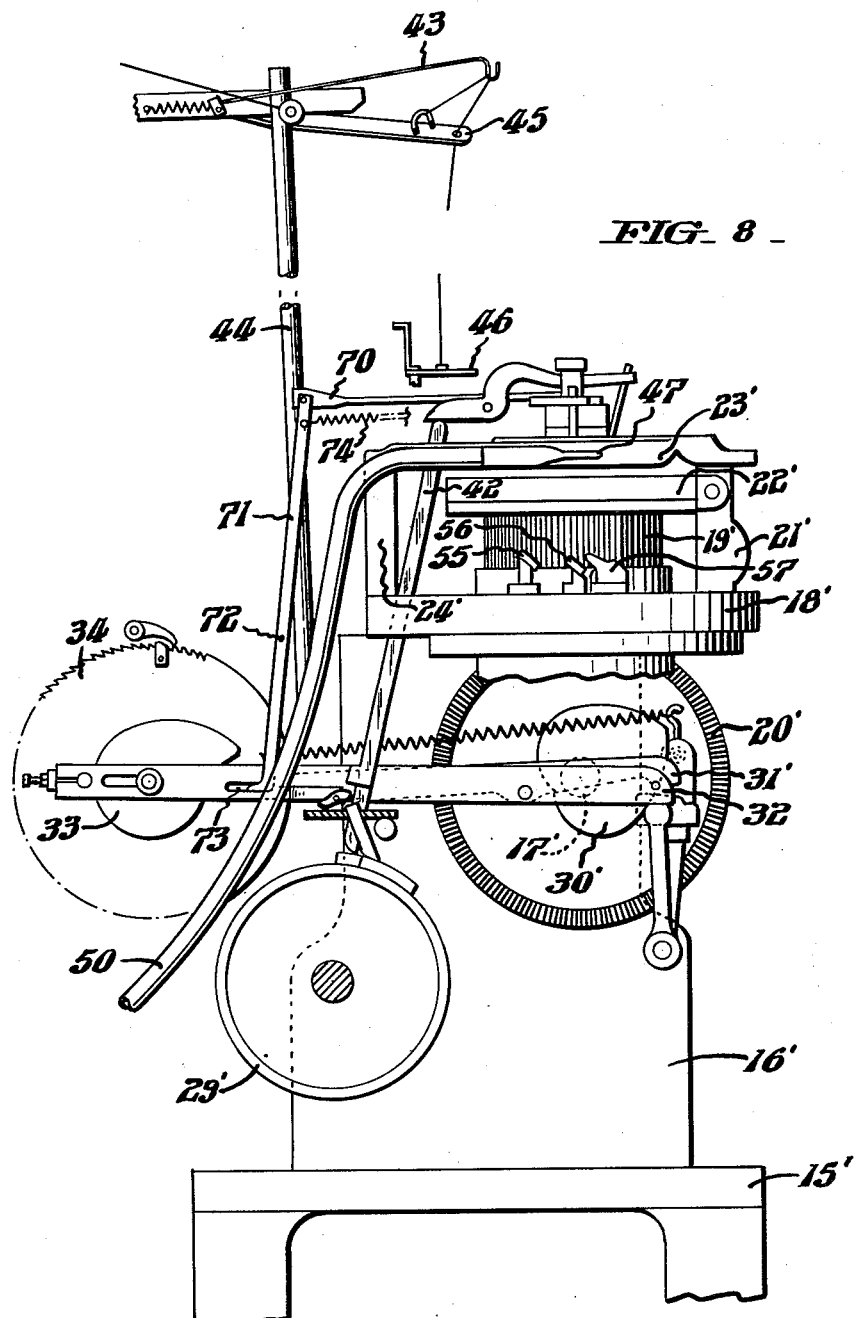

Dec. 8, 1964  B. T. R. REYMES-COLE  3,159,988
HOSIERY FOOTWEAR AND METHOD OF MAKING
Filed April 24, 1962  6 Sheets-Sheet 4
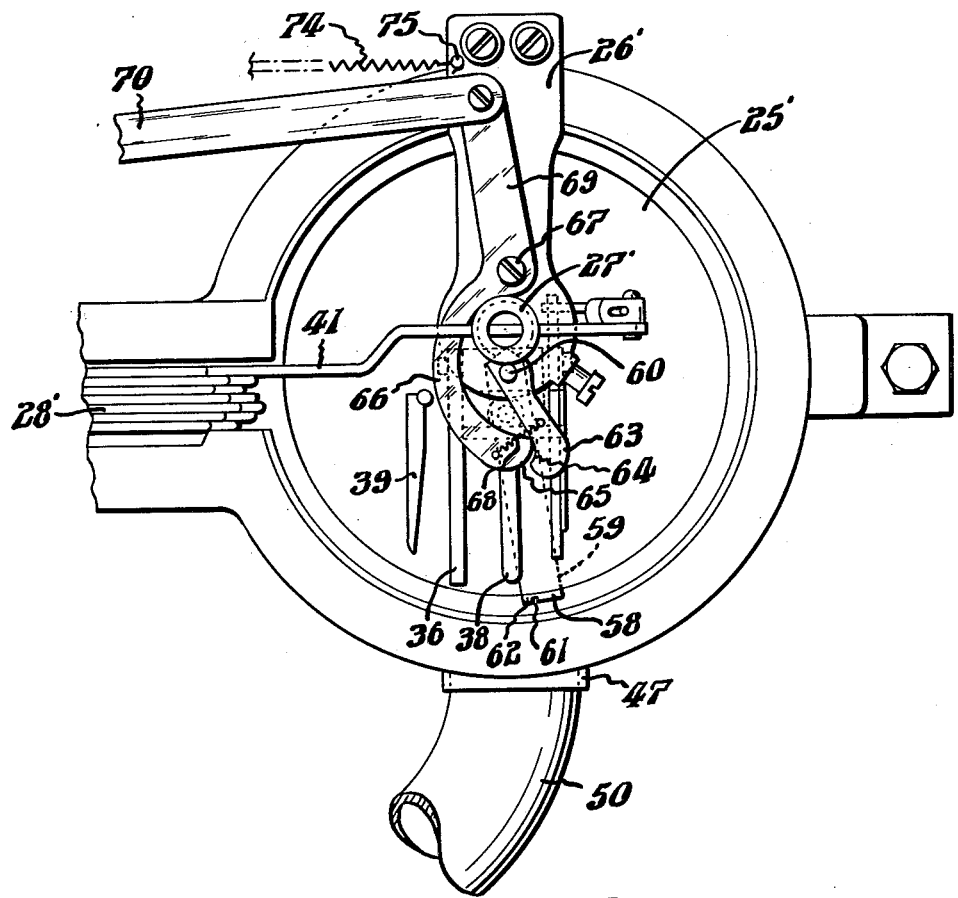
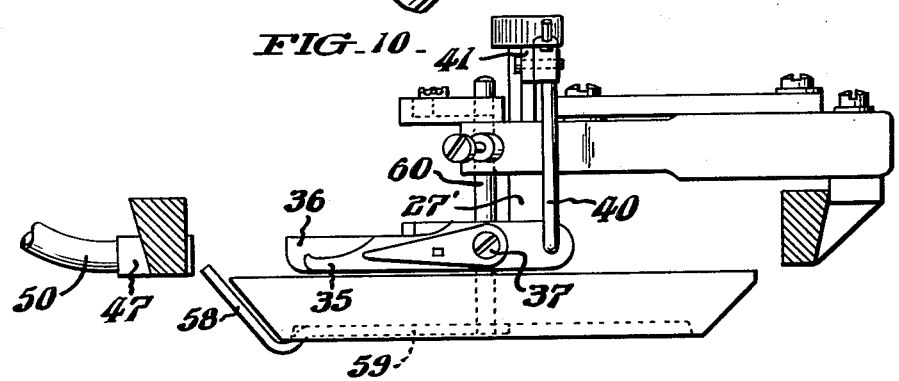
INVENTOR.
Bernard Thornton Reymes Reymes-Cole,
BY
Paul & Paul
ATTORNEYS.

Dec. 8, 1964  B. T. R. REYMES-COLE  3,159,988
HOSIERY FOOTWEAR AND METHOD OF MAKING
Filed April 24, 1962   6 Sheets-Sheet 5
FIG-11-
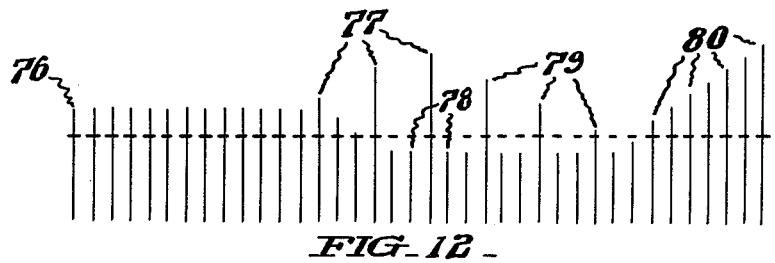
FIG-12-
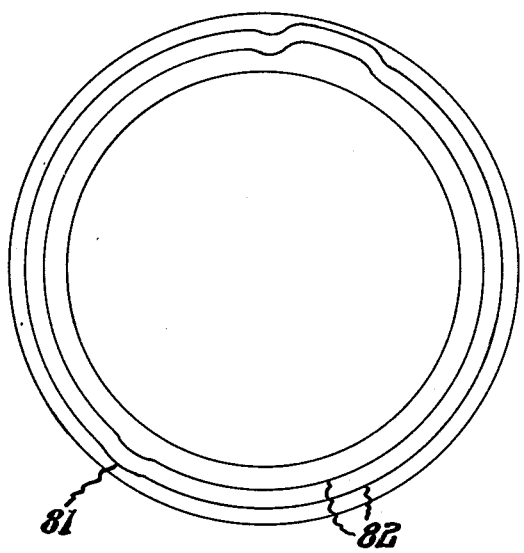
FIG-13-
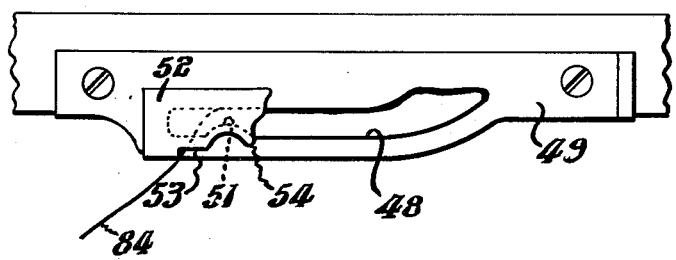
INVENTOR.
Bernard Thornton Reymes Reymes-Cole,
BY
Paul & Paul
ATTORNEYS.

Dec. 8, 1964  B. T. R. REYMES-COLE  3,159,988
HOSIERY FOOTWEAR AND METHOD OF MAKING
Filed April 24, 1962  6 Sheets-Sheet 6

INVENTOR.
Bernard Thornton Reymes Reymes-Cole,
BY
Paul & Paul
ATTORNEYS.

United States Patent Office 3,159,988
Patented Dec. 8, 1964

3,159,988
HOSIERY FOOTWEAR AND METHOD OF MAKING
Bernard Thornton Reymes Reymes-Cole, 29 Station
Road, Desford, Leicestershire, England
Filed Apr. 24, 1962, Ser. No. 189,856
5 Claims. (Cl. 66—49)

This invention is for improvements in or relating to the manufacture of hosiery footwear and has for one of its objects to provide a circularly knitted hose of attractive appearance capable of being produced at a low cost.

This application is a continuation-in-part of applicant's copending application Serial No. 799,341, filed March 13, 1959, now abandoned.

Hosiery footwear articles such as stockings and socks produced by circular knitting are frequently reinforced particularly in the heel and foot by the inclusion of spliced areas extending around part only of the circumference of the fabric. Such areas may be formed by knitting in with the main yarn a splicing yarn which is taken by only a section of the circular row of needles, for example up to about half the needles. In some cases the splicing yarn is cut off during the knitting operation at the edge of the reinforced areas and reintroduced at the commencement of its knitting in the next course, but frequently the splicing yarn is left uncut to form relatively large floats which are subsequently cut out and the yarn ends cropped after completion of the knitting of the tubular article. It has also been the practice in some cases to vary the fabric structure of a circularly knitted footwear article by knitting the main yarn only partly around the needle circle at certain places thereby leaving relatively large floats of yarn extending between the ends of each part circular course, which are subsequently cut out and cropped. The invention has reference to hosiery footwear articles in which the main yarn or a splicing yarn is at places knitted through only part of the needle circle, each coursewise extent of knitting being referred to herein as "part courses," and in which lengths of yarn are left free from the needles to extend between the ends of said part courses, these lengths of yarn being referred to herein as "floats."

In accordance with the invention there is provided a method for the production of an article of hosiery footwear wherein the foot, heel part and leg are knitted mainly or wholly by rotational knitting, at least the heel part being formed at least partly from thermoplastic yarn and wherein part courses of yarn are knitted at least at the heel position on the heelward part of the article by rotational knitting with the floats between the ends of the part courses taken up in the fabric within the circumferential extent of the part courses, and wherein the heel shaping is subsequently formed at least partially by drawing the hosiery article on to a form having the desired heel contour so as to stretch the heel part widthwise to shape and afterwards setting the heel part to the desired shape by the application of heat. The part courses aforesaid may be formed of the same yarn as is used for knitting the remainder of the article or from a different yarn such as a splicing yarn. The floats formed during rotational knitting of the part courses may be taken up in the fabric either by being knitted therein at the same or subsequent course or by being laid into the fabric at short intervals at such subsequent course.

In the procedure according to the invention the areas of fabric in which the part courses are included are caused to have a clean outline since no cutting of the yarn occurs at the edge of the part courses and there are no loose ends left free to produce an untidy or rough border line. In effect, the areas defined by the ends of the part courses have selvedged or equivalent boundaries comparable in appearance to the selvedged boundaries of spliced areas on fully fashioned hose produced on straight bar knitting machines.

The invention includes an article of hosiery footwear knitted wholly or mainly by rotational knitting with the heel part knitted at least partly from thermoplastic yarn and with part courses of yarn incorporated at the heel part with the large floats between the ends of the part courses taken up and incorporated in the fabric within the circumferential extent of the part courses, the shaping of the heel pouch having been effected at least partially by stretching the heel portion widthwise on a shaped form and setting the heel to said shape. The hosiery article may have the said part courses formed of the main yarn to give partial shaping to the heel or it may have the part courses formed of a separate yarn, e.g., a splicing yarn, knitted in with the main yarn at the heel position and if desired also at other parts, for example the toe and/or foot.

The invention will now be more particularly described in connection with a preferred form of method and particular examples of stockings illustrated by the accompanying drawings, in which:

FIGURE 1 is a view of one example of a stocking made according to the invention;

FIGURE 2 is a perspective view on a small scale of a tubular fabric blank used in making the stocking;

FIGURES 3 and 4 show the foot portion in each case of other stockings made in accordance with the invention;

FIGURES 5, 6 and 7 show, on an enlarged scale, portions of the fabric structures used in the stockings;

FIGURE 8 is a general elevation, with certain parts omitted and others broken away, showing a circular knitting machine of orthodox type fitted with apparatus used in carrying out the invention;

FIGURE 9 is a plan view on an enlarged scale of part of the machine as seen looking down from above the needle cylinder;

FIGURE 10 is a side view of the parts in FIGURE 9 partly in central cross-section as seen from the right of that figure;

FIGURE 11 is a diagram showing part of the paths of the needles;

FIGURE 12 shows diagrammatically the path of the sinkers;

FIGURE 13 is an enlarged view of the mouth plate of a suction nozzle; and

Figure 14:
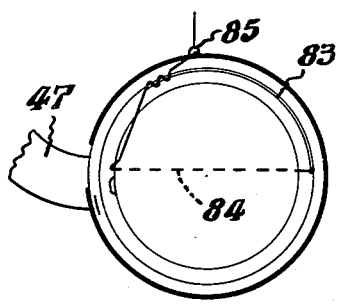
FIGURES 14 to 20 show diagrammatically in plan view various stages in the control of a formed float of yarn to enable it to be taken up and incorporated in the knitted fabric.
Figure 15:
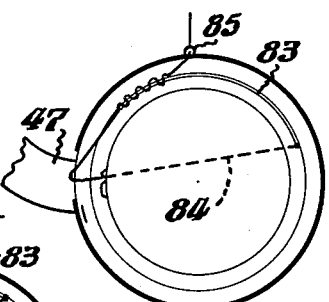

The stocking shown in FIGURE 1 has a welt portion 10, a leg or panel 11, foot 12 and shaped heel and toe portions 13 and 14. The ankle and foot have spliced areas including heel splicing 15, a cuban or high heel splicing 16, foot bottom splicing 17 and toe splicing 18. The stocking has at least the heel portion and preferably the whole stocking knitted from thermoplastic yarn such as nylon or other man-made fiber forming the main yarn. The splicing thread may but need not be a similar yarn. At each side of the heel pouch there is a short curved marking 19 caused by the junction of part courses of knitting around the heel with the remainder of the fabric. The stocking is knitted throughout by rotational knitting to form a tubular blank 20 as indicated in FIGURE 2, the part courses at the heel serving to cause a partial pouch 21 to be formed.

In carrying out the invention, the part courses formed at the heel as described in British Patent No. 756,841 and the part courses of splicing yarn at the spliced areas 15, 16 and 17 are caused to have their floats taken into the fabric around the circumferential extent of the part courses instead of requiring to be subsequently cut away and the cut ends cropped. The floats are either knitted or laid in during the rotary knitting by means provided on the knitting machine and described hereinafter for seizing the floats, drawing them to measured lengths and laying them alternately in front of and behind successive needles or groups of needles in the needle arc at which the part courses are knitted. In each case the ends of the floats which are formed by the yarn rejoining the needles are the first to be incorporated in the fabric during continuance of the rotary knitting. Thereby the spliced areas 15, 16 and 17 and the part shaped areas at the heel are caused to have in the finished stocking a clean outline as indicated at 22 and 19 at each side of the stocking since no cutting of the yarn occurs and no loose ends are left free to produce an untidy or rough border line. In effect, the areas defined by the ends of the part courses of splicing yarn have selvedged or equivalent boundaries 22 comparable in appearance to selvedged borders of spliced areas on fully fashioned hose produced on straight bar knitting machines.

When the tubular blank 20 has been knitted it is laid flat and closed at the toe end by a curved seam 23 joining the overlaid parts of the fabric together and extending from the toe extremity at the center line of the instep portion of the fabric along a line extending centrally and longitudinally under the toe to the bottom center line of the foot. The blank is afterwards drawn on to a shaped form or board on which the heel part is stretched widthwise to distort the fabric to the required heel shape and is set in such shape by the application of heat in known manner. Thus there is produced by circular knitting a seamless stocking which has shaping or fashioning comparable to that of a fully fashioned hose and having spliced areas comparable in neatness to that of such hose.

In the stocking illustrated in FIGURE 3, the foot is constructed similarly to that of FIGURE 1 except that shaping part courses are omitted at the heel, the whole of the heel shaping being obtained by stretching a tubular blank, knitted without the partial pouch 21, on a shaped board or form and setting it in such shape. Similarly FIGURE 4 illustrates the foot portion of another modified construction wherein no splicing is provided at the foot, but the heel is partially shaped by incorporation of part courses, the floats between the ends of which are incorporated in the fabric within the circumferential extent of the part courses, thus forming a neat join line 19 on each side which is devoid of any loose ends.

FIGURES 5, 6 and 7 illustrate the manner in which floats between ends of part courses are incorporated in the fabric and show three portions of fabric, the portions in FIGURES 5 and 6 being seen from the reverse or back face of the fabric, and the portion in FIGURE 7 being seen from the front face. The fabric portion shown in FIGURE 5 corresponds to that in the region of the line 22 in FIGURES 1 and 2 and shows the main yarn 24 and a splicing yarn 25. Portions of the splicing yarn 25 which would normally be floated are laid as shown at 26 in front of sinker loops 30 and behind the needle loops in the spliced area so that the yarn lengths between the ends of the part courses of splicing yarn are taken up and incorporated in the fabric at short intervals so as to lie mainly on the back thereof within the circumferential extent of the part courses. In FIGURE 6 is shown the reverse or back face of a portion of fabric corresponding to that in the region of line 19 of FIGURE 4, complete courses of the main yarn 24 having interposed between them at the heel side part courses 27 also formed of the main yarn and having the lengths of yarn extending between the ends of such part courses laid in as short floats 28 at the back of the fabric caused by such lengths of yarn being passed from the back of the fabric in front of sinker loops 31. The laying in thus causes the said lengths of yarn to be incorporated in the fabric within the circumferential extent of the part courses. Either of the fabric structures of FIGURES 5 and 6 can have the laying in effected at each sinker loop along a course or at intervals of groups of sinker loops along the course. The fabric structure at the neighborhood of the line 19 in FIGURE 1 will correspond to the structure shown in FIGURE 6 except that the complete and part courses of the main yarn at that region will appear as double yarns, the splicing yarn being knitted in with and laid in with the main yarn wherever knitting and laying in occurs. Alternatively, the splicing yarn may be omitted from the part courses 27. The wales to the right of the fabric structure in FIGURE 6 tend to become more spread out as shown, causing the courses to diverge somewhat to the right of the figure, producing the part shaping of the heel.

The fabric structure of FIGURE 7 illustrates the alternative of knitting in the floats in the case of the splicing yarn. Thus the lengths of yarn between the ends of part courses of splicing yarn are incorporated along with the main loops in the knitted structure as indicated at 29.

It will be noted that in any of the portions of fabric shown in FIGS. 5, 6 and 7, each float between successive pairs of part courses is incorporated in the first knit part course. For example, referring to FIG. 5, two successive part courses are designated 25′ and 25″. The part course 25′ is first knit and gives rise to the float 26′, which, as shown, is incorporated in the first knit part course 25′.

The stockings, as shown, may conveniently incorporate features assisting the shaping of the foot. For example, they may have a small tuck formed in the fabric at the toe extremity held in place by the seam 23, or the toeward portion of fabric may be knitted of stretch yarn, or narrow inserts of reciprocatory knitted fabric may be included at the region of the heel and/or toe to assist in shaping or forming ornamental markings.

The invention enables articles of hosiery footwear to be produced particularly economically by a speedy operation of rotary knitting while at the same time producing a particularly neat and attractive article similar in appearance to a full fashioned hose while being substantially less expensive. While the invention is particularly applicable to the production of ladies' stockings it may also be employed in the production of other forms of hosiery footwear such as socks and three-quarter hose. Apparatus suitable for the practice of the invention, now to be described, is in accordance with applicant's copending application, Serial No. 17,361, filed March 24, 1960 now Patent No. 3,120,115.

Referring particularly to FIGURES 8–20, the machine selected for illustration, shown in FIGURE 8, is a circular knitting machine of Scott and Williams type and generally orthodox construction adapted for knitted ladies' hose, as will be readily understood by persons skilled in the art of knitting machinery. It comprises a base or table 15′ carrying a main frame 16′ which supports a main driving shaft 17′ and cylinder bed plate 18′. The needle cylinder shown at 19′ is driven by gear wheel 20′ on shaft 17′ to rotate counter-clockwise as seen from above. Supported by a bracket 21′ from the bed plate 18′ is a sinker cam ring 22′. Above this is the usual latch guard ring 23′ which is pivoted at its rearward part, on the left of FIGURE 8, to a supporting bracket 24′ so that it can be raised when required for access to the interior of the top of the cylinder. The latch guard ring carries centrally at low level within it a stationary trapper plate or disc 25′ supported by a bracket arm 26′ and post 27′.

For feeding yarns to the needles at the main yarn feed station the machine has a group of yarn feeders 28′, FIGURE 9, including a splicing yarn feeder which is brought into and out of operation in orthodox manner and when operative is rendered active and inactive during each cylinder rotation at variable timed intervals. The known mechanism by which this is achieved comprises a control drum 29′ racked round at appropriate times and having a segment acting to hold the feeder inoperative until required, a cam 30′ on main shaft 17′ and related follower mechanism for rocking a lever 31′ to introduce and withdraw the feeder, a slide bar 32 carrying lever 31′, and a cam 33 on a rack wheel 34 for shifting slide bar 32 to vary the timing of introduction and withdrawal of the feeder to alter the width of splicing as required for instance in the splicing of a high heel or cuban or of a foot bottom near the toe and heel ends. The same mechanism acts on other instrumentalities to control the action of an orthodox trapping and cutting device mounted on the trapper plate.

The trapping and cutting device comprises a knife arm 35 and trapper arm 36 mounted to rock together on a pivot 37, FIGURE 10, a fixed spring blade 38 and a guide finger 39. The knife and trapper arms are rocked by means of a link 40, a lever 41 passing through a slot in post 27′ and a push rod 42 operated by the mechanism aforesaid and cooperating with a separate segment or segments on the drum 29′ whereby the cutter and trapper is held open when not in use. The known parts of the machine also include a spring controlled take-up lever 43 mounted at the top of a post 44, and fixed yarn guides 45 and 46. The take-up lever serves to remove any slackness in the splicing yarn between it and the needles.

For practicing the present invention other parts are fitted to the machine as follows. Firstly, at an auxiliary station a suction nozzle 47 is fitted to the lower part of the latch guard ring and opens on to an elongated slot or mouth 48 formed in a plate 49 secured to the interior of the latch guard ring. The suction nozzle 47 is connected by a flexible pipe 50 to a source of suction such as the inlet of an air pump or a vacuum cleaner cylinder. The plate 49, FIGURE 13, has the lower edge of its slot 48 formed with a smal hump 51 and is partly masked by a small thin plate 52 secured to and spaced slightly inwardly from the plate 49. Thus plate 52 provides a narrow yarn guiding slot 53 and a yarn controlling projection 54. Other special parts provided for practicing the invention comprise additional needle and jack operating cams some of which are shown at 55, 56 and 57 in FIGURE 8, a modified sinker track 81, 82 to provide for related variation in sinker operation, and variable float length control means.

The float length control means is provided to measure the length of a float of yarn between the ends of a part course such as is knitted when splicing part way round a hose, or when otherwise knitting part courses say for part shaping purposes, and is shown in FIGURES 8 to 10. This control means comprises a measuring finger 58 on one end of an arm 59 which extends in a recess under the trapper plate 25′ and is secured to the bottom end of a spindle 60 mounted to turn in bearings in the trapper plate 25′ and the bracket arm 26′. The upper extremity of the finger 58 is formed with a notch 61 and small hook 62. On the upper end of spindle 60 is secured an arm 63 having a cam face 64 engaged by a rounded end lobe 65 on a lever arm 66 pivoted at 67 to the bracket arm 26′. The lobe 65 and cam face 64 are maintained in engagement by a tension spring 68 and their shaping determines the required variations in setting of the arm 59. The lever arm 66 has a tail 69 coupled by a link 70 to an upstanding lever 71 pivoted at 72 to a fixed part and having its lower end engaged by a projection 73 on the slide bar 32. The lower end of lever 71 is held against this projection by a spring 74 anchored at 75 to the bracket arm 26′.

It may now be explained that the machine selected for purpose of illustration of the invention has been adapted to enable cut ends or uncut floats of yarn to be laid in with the fabric being produced during the normal operation of the machine with the rotation of the cylinder being continued uninterruptedly. To enable this to be carried out in a simple and effective way use is made of a novel method of controlling the cut ends or uncut floats by means of a localized air stream which draws them taut and holds them extending in an appropriate direction to enable them to be taken up by the needles as required.

To this end the nozzle 47 is positioned close to the needle circle at a short distance rather less than a quarter of the circumference thereof beyond the feeding point, and in the neighborhood of the position of the nozzle 47 the action of the needles is modified so that they are all lowered to about sinker lever after they have passed the stitch and raising the cam at the main station and just before they reach the mouth 48 of the nozzle 47 at the auxiliary station. FIGURE 11 illustrates the paths of the needle hooks as seen from outside the cylinder in the region of the mouth 48 of the nozzle and shows them all at the lowered level indicated at 76 as they pass the nozzle mouth 48. It is noted that the latter is slightly above the tops of the needles when at this level. The lowering of the needles to this level is effected by the needle cam 55, FIGURE 8. Immediately after the needles have passed the nozzle mouth 48 they divide into two streams, certain spaced needles (every third one in the example shown) being raised as at 77 by their jacks and a jack cam (not shown). The remaining intervening needles are lowered still further to the level indicated at 78 by the needle cam 56 which misses the butts on the needles raised by their jacks. Subsequently the raised needles are lowered as at 79 by needle cam 57, and all of the needles are raised by a further jack cam (not shown) as indicated at 80 up to tucking height at which they remain until brought round to the knitting station once again. Simultaneously with the modified action of the needles the sinkers are withdrawn by a slight hump in the sinker cam track causing the tops of the sinkers to move out and in as shown at 81 in FIGURE 12 which shows diagrammatically by parallel lines 82 the path or movement of the tops of the sinkers. The withdrawal and return of the sinkers at 81 is timed to occur as certain of the needles are being raised at 77 and lowered at 79 in FIGURE 11, this being the stage at which yarn ends or floats are being laid in on the needles from the nozzle mouth 48.

In the operation of the machine, the suction nozzle 47 when connected to an operative suction source causes a stream of air to be withdrawn across the needle line at the position at which the needles are lowered as at 76 in FIGURE 11. This will cause any loose lengths of yarn on the inside of the needle circle to be drawn across it and towards the nozzle mouth 48 and if long enough, they will enter the nozzle proper and be held taut by the stream of air imposing drag on them. It will be evident that this manner of control of loose lengths of yarn can be applied usefully in a number of ways in the operation of a knitting machine to ensure desired control of free yarn portions for which purpose relatively complicated mechanisms would otherwise be necessary. The method of air flow control can obviously be used at various positions in the needle circle depending on the purpose for which it is needed. The particular case of incorporation of an uncut float yarn in the fabric being knitted is a particularly useful example which will now be described with reference to FIGURES 14 to 20.

Figure 16:
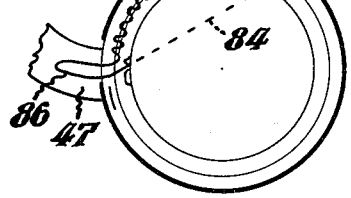
Figure 17:
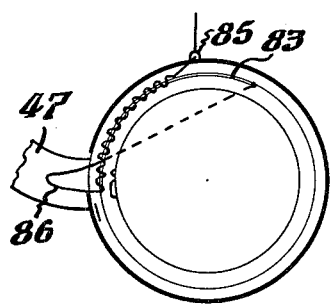

In the procedure of FIGURES 14 to 20 a splicing thread is being incorporated in rotary knitted fabric over a part only of the needle circle indicated by the double line 83. The float which extends between the ends of each part course is indicated at 84. This float commences to be formed from the last stitch in the part course as the needle carrying it moves away from the feeder indicated at 85 after the latter has been withdrawn. The yarn extending from the fabric, while held taut by the take-up lever 43, is caused to pass over the plate 25′ and catch over the hook 62 of measuring finger 58 and then be deflected by the finger under the trapper plate until the stage is reached, as in FIGURE 14, that the feeder is again active to commence knitting the next part course. At this time the length of float is fixed by the pick up of the yarn by the needles and the path of the float extending between that point and the end of the previous part course. This is in fact measured by the position of the measuring finger 58. As the cylinder continues to turn the float 84 becomes slack and passes off the hook 62 being drawn by the air stream partly into the nozzle 47. As knitting proceeds the float becomes drawn into loop 86 in the nozzle and held therein as indicated in FIGURE 16. In FIGURE 17, further turning of the cylinder has caused the arms of the loop 86 to become reversed in position with the last formed end of the float leaving the nozzle, and in FIGURE 18 the float is commencing to be laid into the needles that have been raised at 77, these being the needles on which the part courses have been knitted. The laying in of the float continues through an intermediate stage indicated in FIGURE 19 to the final stage of FIGURE 20 at which the last portion of the float is being laid into the needle hooks of the last few needles of the part couse in the needle arc 83.

Figure 18:
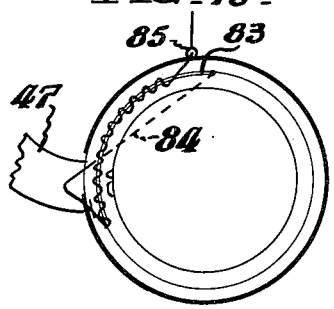
Figure 19:
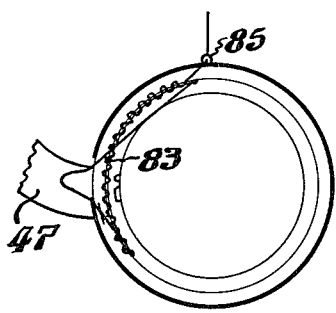
Figure 20:
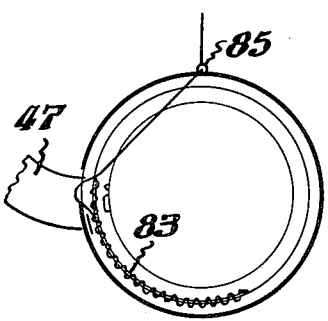

When the float 84 is first taken into the nozzle mouth it passes through the right hand part of the slot 48 as seen in FIGURE 13 and is caused at the stage of about FIGURES 17 and 18 to move under the mask plate 52 and enter the yarn guiding slot 53 for presentation to the needles at a low feeding level. The yarn is drawn through such slot until near the stage of FIGURE 20 at which time the last portion of float is retarded by the hump 51 and projection 54 to prevent it from being released prematurely to the needles and ensure that it is laid in properly at the needles and ensure that it is laid in properly at the last few needles. The measuring of the required length of float 84 is varied to correspond to the length of the needle arc in which part course knitting is performed by adjustment of the measuring finger 58 by the mechanism described for controlling movement of the arm 59. Thus it will be seen that the cam 33 which is racked round to vary the width of splicing by operation of the slide bar 32 causes simultaneous adjustment of the measuring finger 58 by the projection 73 on the slide bar engaging and turning the lever 71 to vary the position of measuring finger appropriately.

The position of the arm 59 may be varied to vary the setting of the finger 58 between a point close to the main knitting station near the feeders 28' and a point about 120° beyond that station. In the setting shown in the drawings and settings further removed from the knitting station the finger 58 causes the float 84 to be immediately presented to the air stream. Shorter floats on the other hand are carried to the air stream by the rotation of the needle cylinder.

The modified action of the needles and sinkers at the auxiliary station, i.e., the region of the nozzle mouth 48, as above described causes the float 84 to be laid in the fabric by being taken up at short intervals without being knitted. This occurs because the float is presented to the hooks of the needles raised at 77 and then lowered by them while the sinkers are withdrawn whereupon the sinkers move inwardly to hold the yarn under their nibs thereby ensuring that the yarn float is passed behind the remaining intervening needles. The float is carried on the needles in this way and permanently incorporated in the fabric at the next course of knitting. Instead of laying the yarn in thus, it could obviously be knitted in by varying the control of the needles near the nozzle mouth 48 to cause them to have knitting action, or the needle and sinker control at that region may be such as to cause the yarn to be engaged and held on all of the needles so as to be knitted in with the next course of yarn at the main knitting station.

Having thus described my invention, I claim as follows:

1. In a method for knitting of the heel of an article of hosiery footwear on a circular knitting machine having a complement of needles and main yarn feed station and auxiliary station, the steps comprising knitting at the main station full courses of yarn at the heel position by rotational knitting, knitting at the main station part courses of yarn at the heel position by rotational knitting and forming floats between the ends of the part courses, presenting each float resulting from the formation of a part course to the needles at the auxiliary station subsequent to knitting of the next part course and preliminarily to incorporating each of said floats into the fabric being formed at the main station commencing at the end of the float proximate the beginning of said part course.

2. A method according to claim 1 wherein the full courses and part courses are formed of different ends of yarn.

3. A method according to claim 1 wherein the floats are presented in front of certain needles and behind intervening needles at the auxiliary station and thereafter permanently incorporated in the fabric at the main station when the next part course is knit.

4. In a rotary knitted article of hosiery footwear, a heel part knitted at least partially of thermoplastic yarn with full courses of main yarn extending therethrough and with part courses of yarn extending therethrough with floats between the ends of the part courses incorporated in the fabric, each float between successive pairs of part courses having been incorporated in the second part course of each successive pair of part courses by being laid therein, the heel fabric being in the form of a pouch and permanently set in such form.

5. An article according to claim 4 having the part courses formed of a separate yarn knitted in with the main yarn at the heel position.

References Cited in the file of this patent

UNITED STATES PATENTS

| | | |
|---|---|---|
| 1,025,125 | Costello | May 7, 1912 |
| 1,460,477 | Carter | July 3, 1923 |
| 2,825,215 | Buckreus | Mar. 4, 1958 |
| 2,911,807 | Lombardi | Nov. 10, 1959 |
| 2,980,981 | Reymes-Cole et al. | Apr. 25, 1961 |

FOREIGN PATENTS

| | | |
|---|---|---|
| 570,180 | Great Britain | June 26, 1945 |